United States Patent [19]

Armor et al.

[11] 4,260,327
[45] Apr. 7, 1981

[54] GUIDE VANE ASSEMBLY FOR REVERSE FLOW COOLED DYNAMOELECTRIC MACHINE

[75] Inventors: Anthony F. Armor, Schenectady; William L. Darby, Scotia; James M. Anderson, Cohoes, all of N.Y.

[73] Assignee: General Electric Company, Schenectady, N.Y.

[21] Appl. No.: 60,642

[22] Filed: Jul. 25, 1979

[51] Int. Cl.³ .................... F04D 29/44; F04D 29/38; F04D 29/02
[52] U.S. Cl. ............................... 415/200; 415/214; 416/241 A
[58] Field of Search .............. 416/241 A, 230 R; 415/200, 214; 428/113

[56] References Cited

U.S. PATENT DOCUMENTS

| | | | |
|---|---|---|---|
| 2,937,805 | 9/1960 | Warnken | 416/230 |
| 3,649,425 | 3/1972 | Alexander | 416/230 |
| 3,739,208 | 6/1973 | Shartrand | 310/58 |
| 3,942,231 | 3/1976 | Whitaker | 416/230 |
| 4,000,956 | 1/1977 | Carlson et al. | 416/230 |
| 4,022,547 | 5/1977 | Stanley | 416/230 |
| 4,039,872 | 2/1977 | Armor et al. | 310/62 |

Primary Examiner—William R. Dixon, Jr.
Attorney, Agent, or Firm—Lawrence D. Cutter; John F. Ahern

[57] ABSTRACT

A reverse flow, gas cooled dynamoelectric machine includes a rotor mounted fan at each machine end for circulating gas coolant throughout the machine. Improved pressure and efficiency for the fan is achieved by positioning stationary guide vanes upstream from the fan for directing gas coolant into the fan blades at an optimum angle. The invention is directed toward an improved guide vane assembly construction and composition.

14 Claims, 16 Drawing Figures

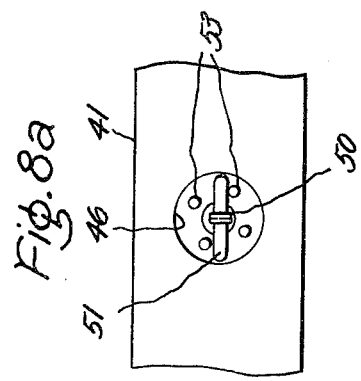
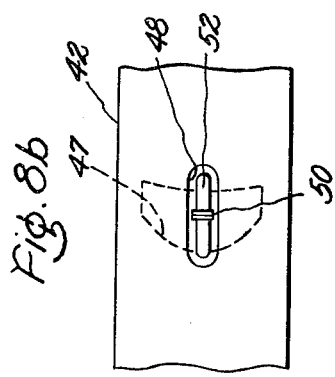
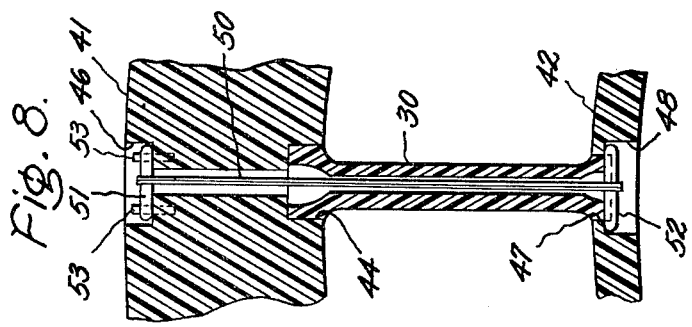
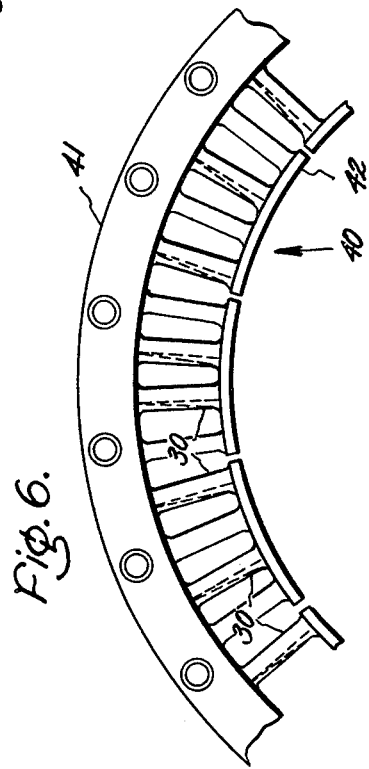
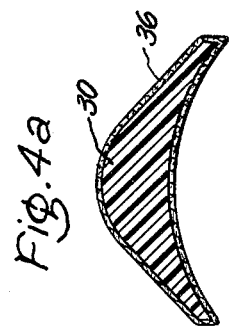
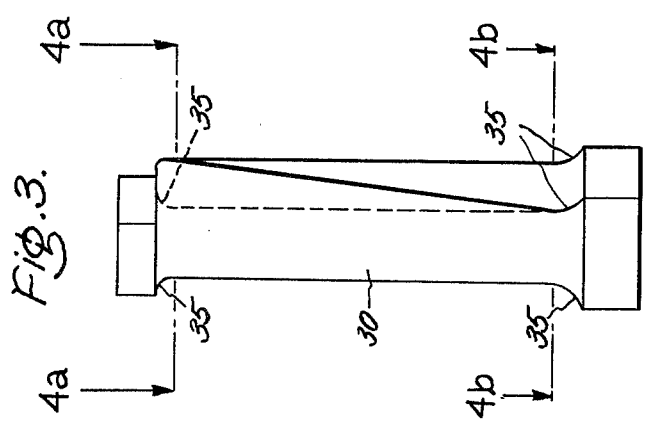
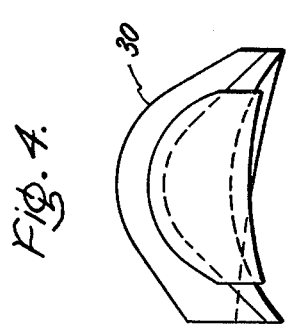

GUIDE VANE ASSEMBLY FOR REVERSE FLOW COOLED DYNAMOELECTRIC MACHINE

FIELD OF THE INVENTION

This invention relates generally to reverse flow gas cooled dynamoelectric machines and more specifically to new and improved guide vanes and a new and improved guide vane assembly employed in a reverse flow cooled dynamoelectric machine.

DESCRIPTION OF THE PRIOR ART

Large dynamoelectric machines such as turbine-generators are pressurized with a cooling gas such as hydrogen which is pumped throughout the machine by a fan fixed to the rotor. The cooling gas is pumped by the fan through cooling passages in a laminated stator core and into a gas gap defined by the interior of the stator core and the rotor surface. Cooling gas may be picked up by the rotor at its outer surface in a manner disclosed in U.S. Pat. No. 3,348,081, to D. M. Willyoung, and pumped through cooling passages defined by the field coils within the rotor, such structure being shown in U.S. Pat. No. 2,986,664, to D. M. Willyoung and P. A. Becker.

One particular cooling system employed in dynamoelectric machines is known as reverse flow cooling, an example of which is disclosed and claimed in U.S. Pat. No. 3,739,208, to Shartrand and assigned to the assignee of the present invention, the disclosure of which is incorporated by reference hereinto. In a reverse flow cooling system such as that shown in the aforementioned Shartrand patent, cooling gas is drawn from the end of the gas gap into the fan and is pumped by the fan to a gas cooler usually located in the upper portion of the machine. From the gas cooler, the flow of cooling gas is split, a portion of it being channeled to the interior of an end portion of the rotor, and the remainder being channeled into cooling passages disposed within the laminations of the stator core.

In operation, these large turbine-generators tend to produce relatively large quantities of stray flux in the end regions. This stray flux is produced by both the rotor windings and the end turns of the armature bars in the stator and includes axial components which tend to penetrate the end portions of the machine causing undesirable eddy current heating. Additionally, in reverse flow cooled turbine-generators, the cooling gas drawn from the end of the gap into the fan often has a rotational velocity components which has been imparted to the cooling gas by the rotation of the rotor. Guide vanes disposed immediately upstream of the fan have been provided, enabling the fan to turn this rotational component of the cooling gas velocity into a useful static pressure thereby to enhance the performance of the fan. However, the stray flux produced by the machine tends to induce eddy current heating in any magnetically susceptible metallic components employed in the guide vanes and any mounting assembly employed therewith. This induced heating in guide vanes and their mounting assembly adversely affects the machine efficiency and thereby lowers the output capability of the machine.

A reverse flow cooled dynamoelectric machine provided with guide vanes and a mounting assembly therefore is disclosed in U.S. Pat. No. 4,039,872 to Armor et al and assigned to the assignee of the present invention. The guide vanes are formed from electrically non-conducting resin-impregnated glass fibers and thus are not subject to induced heating. The mounting assembly is formed of a like electrically non-conducting material for the same purpose and consists for each stage of an outer retaining ring and an inner retaining ring. Each pair of rings fix the respective outer and inner ends of the vanes. In addition to being electrically non-conducting such guide vanes and mounting assembly are designed to have the requisite strength to withstand vibrational, thermal and fluid pressure loading in the operation of the machine. Moreover, the guide vanes and mounting assembly employed in the dynamoelectric machine of U.S. Pat. No. 4,039,872 are characterized by ease of installation and maintenance and by an absence of significant relaxation and dimensional instability of parts.

The guide vanes and mounting assembly of the present invention are adapted for the same advantages and beneficial characteristics as the invention of U.S. Pat. No. 4,039,872, but additionally are constructed in a manner and of materials which facilitate their manufacture and enhance both their strength and their effectiveness in operation.

Accordingly, an object of the present invention is to provide a new and improved guide vane assembly, including new and improved guide vanes, for use in a reverse flow cooled dynamoelectric machine.

Another object of the present invention is to provide an improved guide vane assembly and guide vanes therefor which are especially adapted for substantially increased strength in withstanding vibration thermal and fluid pressure forces acting thereon in operation of the machine.

Another object of the present invention is to provide new and improved guide vanes having configurations which particularly adapt them for both aerodynamic efficiency and structural strength.

Still another object of the present invention is to provide a new and improved guide vane assembly including new and improved means for facilitating assembly and maintenance thereof.

SUMMARY OF THE INVENTION

The objects of the present invention are achieved by providing an improved guide vane assembly comprising a series of guide vanes each molded from layers of fiberglass/epoxy crossplies. The layers are shaped and dimensioned in accordance with several predetermined patterns, and when laid down and bonded together in a predetermined series the layers produce a composite airfoil section which is both predeterminedly twisted about its longitudinal axis from root to tip and has a uniform chord dimension throughout its length. The outer layers of the vanes can be made from a composite material having a higher modulus of elasticity thus enhancing the strength of the vanes. The vanes have their root and tip ends seated, respectively, in predeterminedly oriented airfoil shaped recesses formed in outer and inner support rings. The outer and inner rings each comprise a plurality of arcuate segments, each of which is formed from multiple layers of mutually bonded fiberglass/polyester woven roving and needled glass fibers. In addition to cementing, the vanes are each secured in the rings by a filamentary fiberglass/polyester tie which is twisted and has its ends secured by fiberglass/polyester toggle dowels positioned and secured against rotation in recesses in the peripheral surfaces of the support rings.

By means of the above-discussed construction the overall assembly can be easily assembled during manufacture. Additionally, this arrangement is not subject to inductive heating and the individual vanes' and ring segments, by virtue of the composite glass/resin construction are particularly suited for withstanding vibration thermal and fluid pressures during operation. Additionally, the vane configuration particularly enhances vane strength and adapts the vane for effectively handling both incoming gas axially directed against part of the vane and incoming gas with various components of circumferential velocity, or swirl, directed against the remainder of the vane.

DESCRIPTION OF THE DRAWING

FIG. 3 is a side elevation view of a guide vane constructed according to the present invention;

FIG. 4 is a top end view of the guide vane illustrated in FIG. 3;

FIG. 4a is a cross-sectional view of the guide vane of FIG. 3 taken along the lines 4a—4a and looking in the direction of the arrows;

FIG. 4b is a cross-sectional view of the guide vane of FIG. 3 taken along the lines 4b—4b of FIG. 3 and looking in the direction of the arrows;

FIG. 6 is a side elevation of a part of a mounting assembly constructed according to an embodiment of the present invention.

FIG. 8 is a sectional view illustrating a twist-tie arrangement for mounting the guide vanes in the outer and inner rings; and FIGS. 8a and 8b illustrate the twist-tie arrangement for the outer support ring and the inner support ring respectively. In this arrangement a toggle lies within a counterbore (in the outer ring) or a milled groove (in the inner ring) and is secured against rotation in the outer ring by a dowel. The ties being twisted and the toggles being so secured, the polyester tie resin then cures to form a solid, tensioned tie.

DESCRIPTION OF A PREFERRED EMBODIMENT

Figure 1:
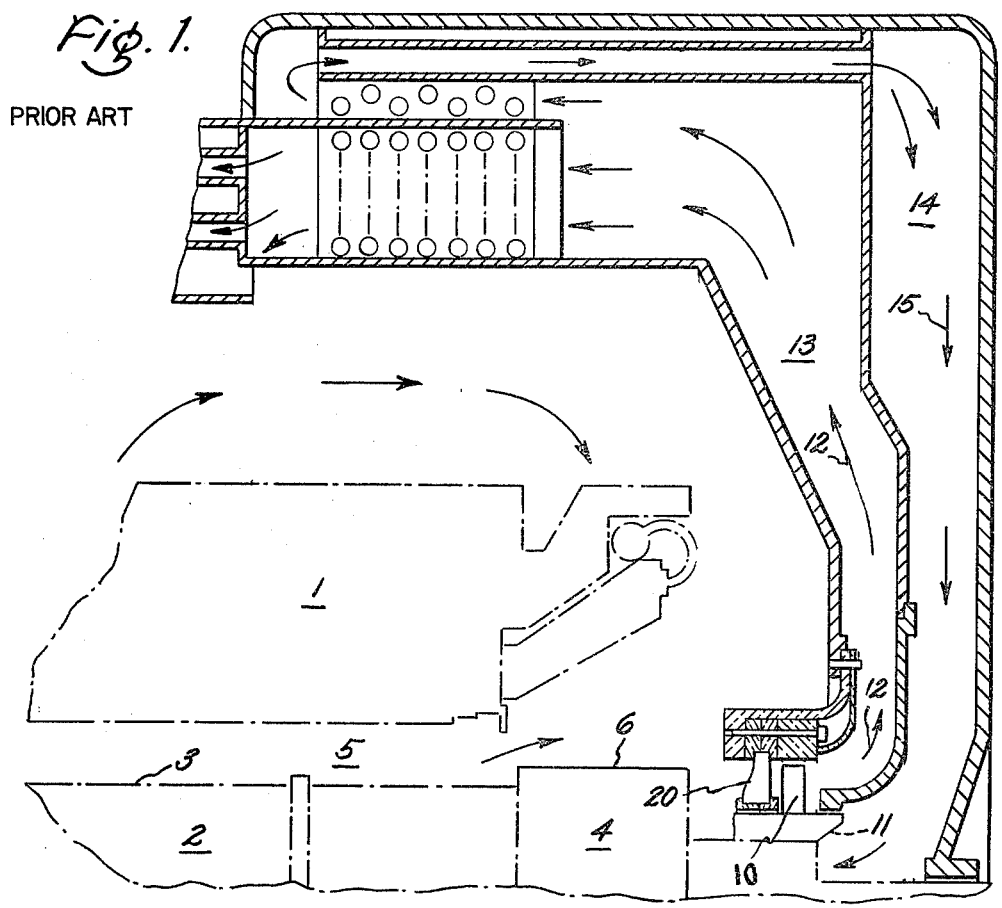
FIG. 1 is a view in partial section of one end of a reverse flow cooled dynamoelectric machine illustrating a prior guide vane and mounting assembly.

FIG. 1 shows an end portion of a reverse flow cooled dynamoelectric machine which is constructed generally according to the description in U.S. Pat. No. 4,039,872 and includes a stator core generally indicated at 1. The opposite end of the dynamoelectric machine is substantially identical and therefore need not be illustrated here. A rotor generally designated 2 is disposed within stator core 1 and includes a body portion 3 and an end winding portion 4. A generator field winding is disposed within the rotor and may be directly cooled by gas picked up by the rotor from gap 5 and pumped through cooling passages (not shown) machined in the windings and terminating in holes in the outer surface of the rotor 2. The details of the field winding cooling passages are not part of the present invention and may be as disclosed in U.S. Pat. No. 3,986,664, to Willyoung and Becker. A retaining ring 6 is shrink-fitted onto the end of the rotor for the containment of the end windings of the field coils.

A fan 10 is fixed to a fan support ring 11 disposed at the end of the rotor and pumps cooling gas in the direction of arrows 12 from gap 5 to coolers disposed in the upper portion of the machine through a suitable channel 13 and then through cooling passages (not shown) in core 1. Gas is also fed from coolers to a suitable channel 14 as indicated by arrows 15 and enters the rotor's end via suitable passages (not shown) under the fan ring. Some of this gas then enters gap 5. In operation, the gas drawn from gap 5 by fan 10 passes over retaining ring 6 which imparts a rotational velocity component to the main axial flow. Guide vanes, one of which is shown at 20, are employed enabling the fan to turn this rotational velocity component into a useful static pressure for thereby enhancing the performance of fan 10 and the entire cooling system of the machine. These guide vanes are also employed to direct the flow into the fan blades at a uniform angle consistent with the setting angle of the fan blades.

In accordance with the invention of U.S. Pat. No. 4,039,872 and in order to minimize any induced heating within the end regions of the dynamoelectric machine, non-metallic, non-magnetic composite guide vanes and a composite mounting assembly therefore are provided. As better seen in FIG. 2, the guide vane mounting assembly comprises a generally annular fan nozzle ring 21 to which is suitably secured a composite outer guide vane support ring 22. The radially outer support ring 22 includes a dovetail recess 23 which accepts a mating dovetail outer end portion 24 of guide vane 20. Similarly, a radially inner guide vane support ring 25 maintains the alignment of guide vane 20 while ensuring the structural integrity of the guide vane assembly and includes a dovetail recess 26 which receives the inner dovetail end portions of guide vanes 20. In this assembly, the support rings; are formed also of non-metallic, non-magnetic material. Additionally, the guide vanes 20 are bonded to the support rings at the dovetail recesses thereof with the use of a suitable, non-conductive cement.

Figure 2:
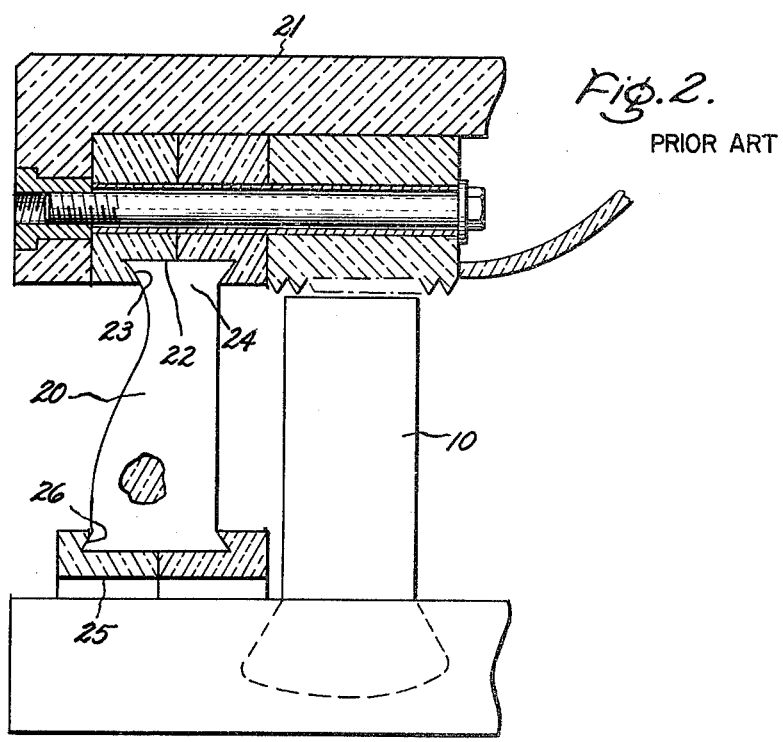
FIG. 2 is an enlarged view of a portion of FIG. 1.

In operation of the prior dynamoelectric machine shown in FIGS. 1 and 2 some cooling gas is drawn from gap 5, passes over retaining ring 6, and enters fan 10 through the guide vanes 20 and some comes from the back of the core. The rotating retaining ring 6 imparts a rotational velocity components, or swirl, to some of the gas drawn into the fan. The guide vanes have an airfoil cross-section from root to tip for the purpose of efficiently guiding the cooling gas stream into the fan 10. The guide vanes total about fifty to one hundred typically and as disclosed in U.S. Pat. No. 4,039,872 can be molded from a resin reinforced with chopped glass. In this arrangement the guide vanes 20 enable the fan to develop more useful static pressure, while also improving the fan efficiency.

The present invention comprises guide vanes 30 shown in FIGS. 3 and 4 and which serve generally the same basic purposes as the prior vanes 20 shown in FIGS. 1 and 2. However, the guide vanes 30 of the present invention are especially adapted for increased strength and for increased efficiency in directing incoming gas to the fan.

Figure 5:
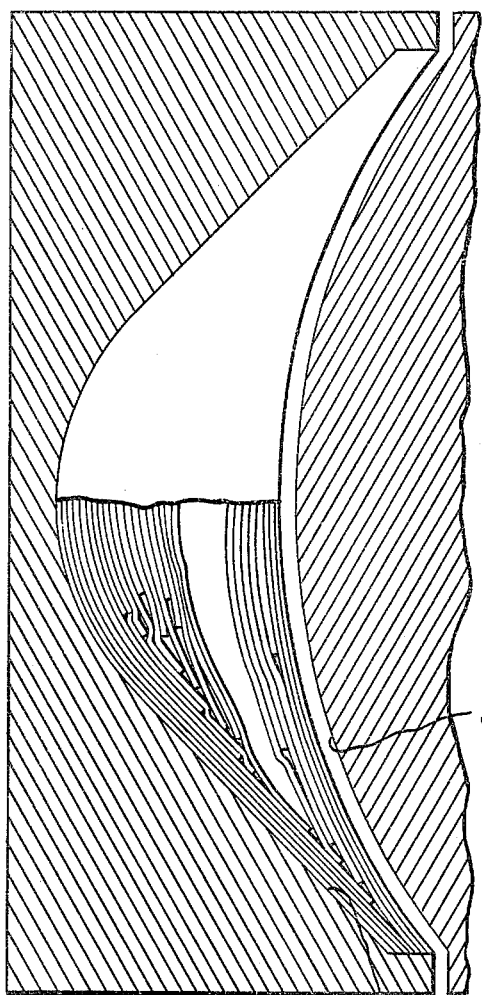
FIG. 5 is a cross-sectional view of a forming mold and layers of crossplie material positioned therein to form a guide vane of the type illustrated in FIG. 3.

More specifically, the guide vanes 30 are adapted for increased strength by being molded from layers of fiberglass/epoxy crossplies which are thermally cured and shaped to have an airfoil cross-section with a predetermined camber as illustrated in FIG. 5. The crossplies can advantageously be made of 90° crossply fiberglass fabric prepregnated with an epoxy resin which is solid at room temperature and is adapted for being cured further at elevated curing temperatures. Such a crossply is available under the trademark SCOTCHPLY 1003, from the 3M Company of Minneapolis, Minnesota.

Additionally, and as best seen in FIGS. 4, 4a and 4b, the guide vanes 30 are each formed with a twist, or rotational displacement of the camber thereof, proceeding generally uniformly from their root ends to their tips. This twist accepts gas entering the guide vane at various flow angles along the length of the vane which has the beneficial effect of enabling the guide vanes to cooperate more efficiently with both that incoming gas which is wholly axially directed toward the vanes and that which has a component of circumferential velocity, or swirl. More specifically, this manner of cooperation enables the gas to enter the fan at an optimum flow angle which results in increased fan operating efficiency. The particular amount of twist to be provided for the airfoil of the guide vanes in order to obtain more efficient fan operation can be determined empirically and with the use of modeling. Basically, however, the amount of twist provided for in the design of a guide vane depends upon a given machine design and specifically upon the tangential forces exerted upon gas impinging the vanes; the greater the swirl of gas directed against a section of the vane, the greater should be the twist at that section. This serves to direct the gas flow into the fan blade at an optimum angle along the blade length thus enhancing fan pressure development and fan efficiency.

Figure 5A:
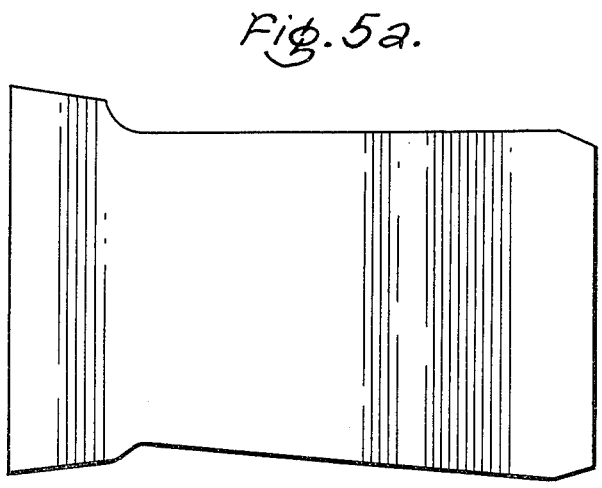
FIGS. 5a, 5b and 5c are views of the differently shaped and dimensioned crossply layers used to fabricate guide vanes according to FIG. 3.

The fabrication of the guide vanes 30 with the above-discussed twisted configuration involves the use of a special mold 31 shown in FIG. 5 having opposed concave and convex molding surfaces 32 and 33, respectively. The surfaces 32 and 33 are also predeterminedly contoured to provide the above-discussed twisted configuration of vanes formed therein. Additionally, the mold is adapted to accept a plurality of layers of epoxy impregnated fiberglass crossplies which have been formed according to several predetermined shapes and dimensions illustrated in FIGS. 5a, 5b and 5c and which are laid up in the mold in the manner seen in FIG. 5 in accordance with a predetermined layup schedule, a preferred example of which is as follows:

| Layer | Width (inches) | Layer | Width (inches) |
|---|---|---|---|
| 1 | F1 | 20 | 2½ |
| 2 | F1 | 21 | 1½ |
| 3 | F1 | 22 | ¾ |
| 4 | F1 | 23 | 1 |
| 5 | 3 | 24 | 2 |
| 6 | 2½ | 25 | ¾ |
| 7 | 2 | 26 | 1 |
| 8 | 2½ | 27 | 1½ |
| 9 | ¾ | 28 | 2 |
| 10 | 1 | 29 | 1½ |
| 11 | 2 | 30 | 1 |
| 12 | 1½ | 31 | 2½ |
| 13 | ¾ | 32 | 1½ |
| 14 | 1 | 33 | 2 |
| 15 | 1½ | 34 | 2½ |
| 16 | 2 | 35 | 1 |
| 17 | ¾ | 36 | F2 |
| 18 | 1 | 37 | F2 |
| 19 | 1½ | 38 | F2 |

In the foregoing sample schedule the layers 1 through 38 are adapted for being superimposed in the concave section 32 of the mold 31, with the layers numbered from the convex section 33 inward toward the concave section. Layers 1 through 4 identified as F1 are generally shaped and dimensioned in accordance with FIG. 5a and layers 36 through 38 are shaped and dimensioned according to FIG. 5c. The specific dimensions are determined in accordance with the dimensions and surface contours of the forming mold used and the amount and form of twist desired for the airfoil surfaces on the finished guide vanes.

Figure 5B:
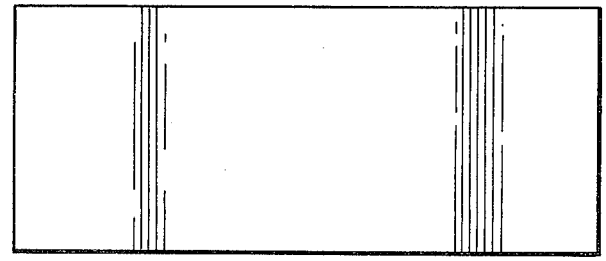
Figure 5C:
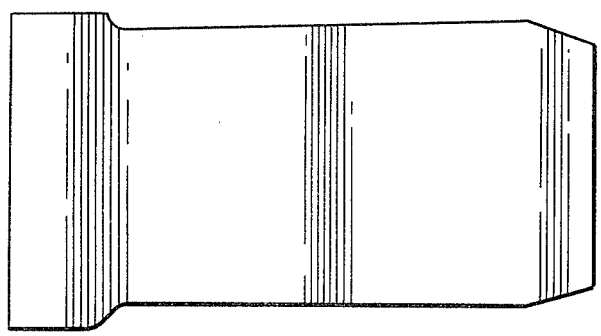

The intermediate layers 5 through 35 are all rectangular as shown in FIG. 5b and have various widths as indicated in the schedule. The lengths of all layers in the sample schedule are 6½ inches.

Thus, the predeterminedly shaped and dimensioned fiberglass epoxy-impregnated crossplies are positioned in the concave section 32 of the mold 31 and the convex surfaced section 33 is placed in position atop the concave section. The mold is then placed in an oven, pressed and heated to a degree effective to cause curing of the epoxy and formation of a unitary solid and crossply reinforced guide vane structure. As a result of the shapes and dimensions of the layers indicated in the foregoing sample schedule and FIGS. 5a, 5b and 5c, and the predeterminedly contoured surfaces formed in the mold sections, the resultant guide vane assumes the configuration illustrated in FIGS. 3, 4, 4a and 4b wherein the airfoil camber, or convex surface, is twisted or angularly displaced along the longitudinal axis thereof from the root to the tip of the vane.

Additionally, the vane 30, even though twisted in form, has a substantial and uniformly dimensioned chord length and other substantial cross-sectional dimensions throughout its length and is reinforced by the crossply composite structure. As a consequence the vane is rigid and characterized by substantial strength to withstand operating stresses. Furthermore, all transitional sections between the shank of the vane and the root and tip portions, indicated by 35 in FIG. 3 are smoothly flared and formed with continuous fibers which enhances the strength of the vane at these sections. Cavities formed in the flared ends of the molded vanes can be advantageously filled with a thermally curable mixture of fiberglass fibers and resin.

The guide vanes 30 can be further strengthened, if desired, by providing them with an outer skin indicated by 36 in FIGS. 4a and 4b and formed of a substantially stiffer composite material than that of which the vane is formed. The outer skin 36 can be formed, for example, of a prepregnated carbon fiber/epoxy composite which is available under the designation SP388 from the 3M Company of Minneapolis, Minn. The outer skin can be formed by laying appropriately shaped and dimensioned layers of the indicated composite in the bottom section of the mold on the concave surface thereof 32 and between the convex mold surface 33 and the top of the stack of layers in the mold. Thusly, when the mold is pressed and heated to effect a cure of the composite structure, the carbon fiber/epoxy layers are bonded to the other stacked layers to form smooth integral outer surfaces on the vanes and which are characterized by a high modulus of elasticity and are effective for stiffening the vanes. Alternatively, a composite of boron fibers and an epoxy may be used in providing a smooth outer layer having a high modulus of elasticity and effective for stiffening the vanes and affording a smooth air flow therepast. Preferably, the outer layers or coatings 36 have a substantially greater modulus of elasticity than the underlying structure of the vanes. The outer coatings 36 can comprise, for example, up to several layers of the indicated prepregnated composite and, if desired, can comprise all of the layers F1 and F2 noted in the sample layup schedule.

The vanes 30 are adapted for being mounted radially in an annular vane assembly generally designated 40 and illustrated partially in FIG. 6. More specifically, a plurality of vanes 30 are mounted in circumferentially spaced relation between radially spaced outer and inner vane support rings 41 and 42, respectively, of the assembly 40. Assembly 40 normally comprises two 180° segments.

The outer and inner support rings 41 and 42 are similar in construction and each constitutes a plurality of arcuate segments comprising composites of bonded fiberglass/polyester material. Additionally, the support rings 41 and 42 and other elements used therein for providing a unitary assembly to support the vanes are also formed of non-metallic, non-magnetic materials to avoid inductive heating thereof during operation.

Figure 7:
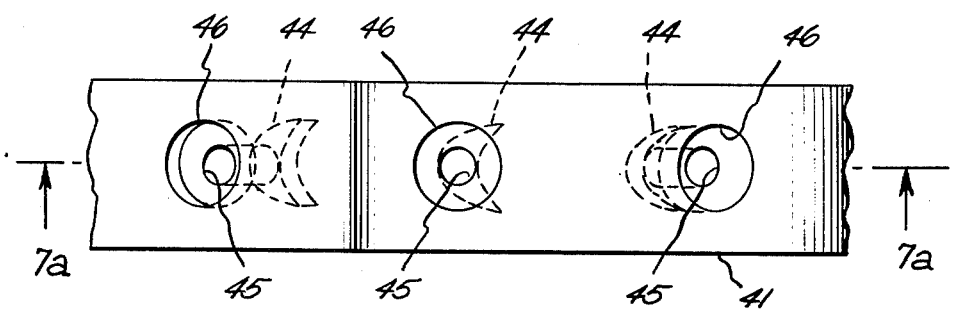
FIG. 7 is a plan view of a section of an outer ring segment, fabricated according to an aspect of the present invention.
Figure 7A:
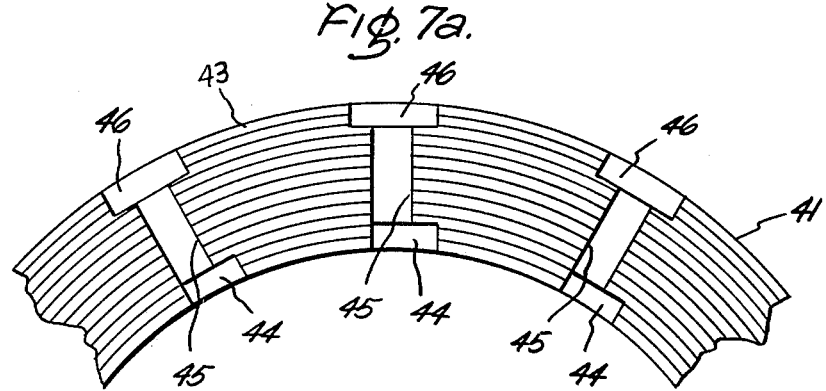
FIG. 7a is a sectional view taken along the lines 7a—7a of FIG. 7 and looking in the direction of the arrows.

As best seen in FIGS. 7 and 7a, the outer support ring 41 is formed of a stacked plurality of layers or plies 43 of non-metallic, non-magnetic fiber-reinforced material and includes spaced recesses 44 which have an airfoil configuration corresponding to the cross-sectional configuration of the tips of the guide vanes 30. More specifically, the segments comprising the outer ring 41 are formed from a stack of layup pieces of fiberglass/woven roving fabric. Additionally, for this application such a fabric bearing a fiberglass jackstraw backing has been found particularly effective. A material of this type found especially suitable is available under the trademark FABMAT from Fiberglass Industries, Inc., Amsterdam, New York.

The procedure for manufacturing the outer ring 41 specifically involves stamping the necessary fiberglass layers 43 out of layup pieces which, when the layers are stacked in the manner shown in FIG. 7a, will cause to be formed the recesses 44 having the above-discussed airfoil configuration. Radially extending passages 45, and circular recesses 46 shown in FIGS. 7A, 8 and 8a are later machined into the ring. These layup pieces are wetted with a suitable polyester resin and are stacked appropriately in a mold and fitted over suitable protrusions in the mold corresponding in cross-section to the mentioned recesses and radial passages to be formed in the ring segments. Then the mold is closed and the laidup crossplies therein are thereby caused to be cured and mutually bonded to result in a composite glass-/polyester structure which is substantially rigid. The layup is then removed from the mold by first removing the mold sides and then individually the mold protrusions and the layup is then post baked to achieve final cure. This molded construction of woven fabric is better able to withstand operating stresses without cracking, than, for example, a unidirectional filament wound support ring.

The inner support ring 42 can be manufactured in substantially the same way and of the same material as the outer support ring. However, as indicated by FIGS. 8 and 8b the layups used in fabricating the inner support ring segments are stamped to provide a pattern which will produce, when stacked and cured, recesses 47 having airfoil-like cross-sections corresponding to the cross-section of the roots of the guide vanes. The elongated recesses 48, positioned in the inner peripheral surface of the inner ring, are later machined into the ring.

The guide vane assembly 40 is assembled by positioning the individual guide vanes 30 with their outer tips and root portions seated in their respective airfoil-shaped recesses 44 and 47. The angular orientations of the airfoil shaped recesses in the support rings are predetermined in order to provide a predetermined angle of attack between the gas passing through the vane assembly and the airfoil surfaces on the vanes in the assembly for the purpose of directing optimally the gas into the cooperating fan. A cement is used to hold the ends of the vanes in place in the support rings. Additionally, the vanes are held in the assembly and the support rings are positively locked together by means of polyester impregnated fiberglass filament ties 50 best seen in FIG. 8. Each tie 50 can, for example, comprise a plurality of elongated loops of fiberglass roving material which are twisted to tension the tie and extend through drilled longitudinal passage in the vane. The ends of the loops pass over outer and inner fiberglass toggle dowels 51 and 52, respectively. The inner toggle dowels 52 are seated in the elongated recesses 48 in the inner support ring 42 and thus are effectively restrained from rotation and permitting uptwisting of the ties. The twisting of the ties places the vane support ring assembly under compression and thus serves to assist in maintaining the unit in its assembled form. The toggle dowels 51 are used in effecting the twisting of the ties and are restrained against untwisting until the polyester tie resin cures by fiberglass locking dowels 53 suitable anchored in the bottom of each of the circular recesses 46 in the outer support ring 41.

While there has been shown and described specific embodiments of various features of a guide vane and guide vane assembly, it will be apparent from the foregoing disclosure that modifications may be made to the disclosed embodiments without departing from the substance of the present invention, and it is intended by the appended claims to cover any such modifications as come within the spirit or scope of this invention.

What is claimed is:

1. A guide vane assembly for use in a reverse flow dynamoelectric machine comprising:
   a pair of radially spaced outer and inner support rings each comprising a composite structure of polyester bonded layers of fiberglass woven roving fabric, each of said rings having an integral structure along the axial dimension thereof; and,
   a plurality of airfoil shaped guide vanes mounted radially between said support rings in circumferentially spaced relation with one another and each comprising a composite structure of epoxy-bonded layers of fiberglass crossplies.

2. A guide vane assembly according to claim 1, wherein said guide vanes have surface portions comprising outer layers of a composite bonded electrically non-conductive, non-magnetic, material having a modulus of elasticity greater than that of the underlying portions thereof.

3. A guide vane assembly according to claim 2, wherein said coatings on said guide vane comprise a material selected from the group consisting of epoxy bonded carbon and epoxy bonded boron fibers.

4. A guide vane assembly according to claim 1, wherein said guide vanes are characterized by uniform chord dimensions throughout their lengths and airfoil cross-sections which are angularly displaced differentially relative to the longitudinal axes of said vanes.

5. A guide vane assembly according to claim 1, wherein the root and tip ends of said guide vanes have airfoil shaped cross-sections and are seated in correspondingly shaped and predeterminedly oriented recesses in the peripheral surfaces of said outer and inner support rings.

6. A guide vane assembly according to claim 1, wherein said guide vanes include longitudinal passages, and cured fiberglass resin ties extend through said passages and have the ends thereof secured to said outer and inner support rings to maintain said assembly as a unitary structure.

7. A guide vane assembly according to claim 6, wherein said ties each comprise a plurality of loops of fiberglass filaments twisted to place them in tension, and fiberglass dowels are positioned in the opposite ends of said loops and are secured to respective outer and inner support rings whereby the tensile forces in said ties are utilized for holding said assembly together in compression.

8. A guide vane assembly according to claim 6, wherein said ends of said ties pass through apertures in said outer and inner support rings, and said dowels are positioned and secured against rotation in apertures located, respectively, in the outer peripheral surface of said outer ring and in the inner peripheral surface of said inner support ring.

9. A fluid flow guide vane for use in a dynamoelectric machine comprising an airfoil shaped composite structure of bonded superimposed layers of fiberglass crossplies, said crossplies being relatively differentially and predeterminedly dimensioned to determine the cross-sectional forms and dimensions of different sections along the length of said vane.

10. A fluid flow guide vane according to claim 9, wherein the surface of said composite structure comprises outer layers of a composite bonded electrically non-conductive, non-magnetic material having a modulus of elasticity greater than that of the underlying composite structure.

11. A fluid flow guide vane according to claim 10, wherein said coating comprises a material selected from the group consisting of epoxy bonded carbon and epoxy bonded boron fibers.

12. A fluid flow guide vane according to claim 9, further comprising tip and root portions at opposed ends of said airfoil shaped structure, and gradually transitioning sections between the surfaces of said airfoil shaped structure and the surfaces of said tip and root portions.

13. A segmental section of a ring member for use in supporting guide vanes in a dynamoelectric machine, comprising an arcuate composite structure of polyester bonded superimposed layers of fiberglass woven roving fabric extending substantially perpendicular to the radius thereof, each of said layers having a plurality of predeterminedly located apertures in said layers being positioned with said apertures aligned whereby recesses are defined by said apertures for receiving ends of said guide vanes.

14. A segmented section of a ring member according to claim 13, wherein said layers have a plurality of airfoil shaped and predeterminedly angularly oriented apertures corresponding to airfoil shaped ends of guide vanes and effective for predeterminedly angularly orienting said guide vanes when said ends thereof are seated in said recesses defined by said apertures.

* * * * *